United States Patent [19]

Levenson

[11] Patent Number: 4,759,719

[45] Date of Patent: Jul. 26, 1988

[54] TEACHING DEVICE FOR THE DEMONSTRATION OF SCIENTIFIC PRINCIPLES

[76] Inventor: Michael K. Levenson, 3012 S. Evergreen Rd., Tempe, Ariz. 85282

[21] Appl. No.: 2,496

[22] Filed: Jan. 12, 1987

Related U.S. Application Data

[63] Continuation-in-part of Ser. No. 909,619, Sep. 22, 1986, abandoned.

[51] Int. Cl.$^4$ .............................................. G09B 23/06
[52] U.S. Cl. ................................. 434/300; 219/275; 118/726
[58] Field of Search ................... 434/298–300, 434/301; 422/244; D24/8, 32; D23/149, 209, 365; 118/715, 718, 726, 728, 733; 427/237, 250, 255; 219/271, 275

[56] References Cited

U.S. PATENT DOCUMENTS

| | | | |
|---|---|---|---|
| 2,107,784 | 2/1938 | Gardner | 427/69 |
| 2,267,343 | 12/1941 | Scott et al. | 118/726 |
| 2,447,979 | 8/1948 | Hensel et al. | 420/497 |
| 3,250,022 | 5/1966 | Midgley | 434/300 |
| 3,410,986 | 11/1968 | Groom | 219/271 |
| 3,906,188 | 9/1975 | Gamell | 219/275 |
| 4,482,799 | 11/1984 | Pricenski | 219/275 |
| 4,608,831 | 9/1986 | Gustafson | 62/55 |
| 4,632,052 | 12/1986 | Flatscher et al. | 118/727 |

FOREIGN PATENT DOCUMENTS

| | | | |
|---|---|---|---|
| 3151825 | 8/1982 | Fed. Rep. of Germany | 219/275 |
| 493249 | 4/1954 | Italy | 219/271 |
| 771707 | 10/1980 | U.S.S.R. | 434/298 |

OTHER PUBLICATIONS

IBM Technical Disclosure Bulletin, V. J. Silvestri, vol. 8, No. 5, Oct. 1965, pp. 708, 709.
RCA Technical Notes, Phillip Goldstein, RCA TN No. 723, Jun. 1967, one page.

Primary Examiner—John E. Murtagh
Assistant Examiner—Andrew Joseph Rudy
Attorney, Agent, or Firm—Joseph H. Roediger; Gregory Nelson

[57] ABSTRACT

Demonstration apparatus for showing the process of vapor phase deposition and extractive metallurgy is disclosed wherein a vacuum vessel is provided with an inner vessel containing a resistive heater and source material. A condenser is utilized to promote deposition of material on the inner vessel in a controlled manner. A furnace containing a resistive heater and the source material is supported in the inner vessel.

7 Claims, 2 Drawing Sheets

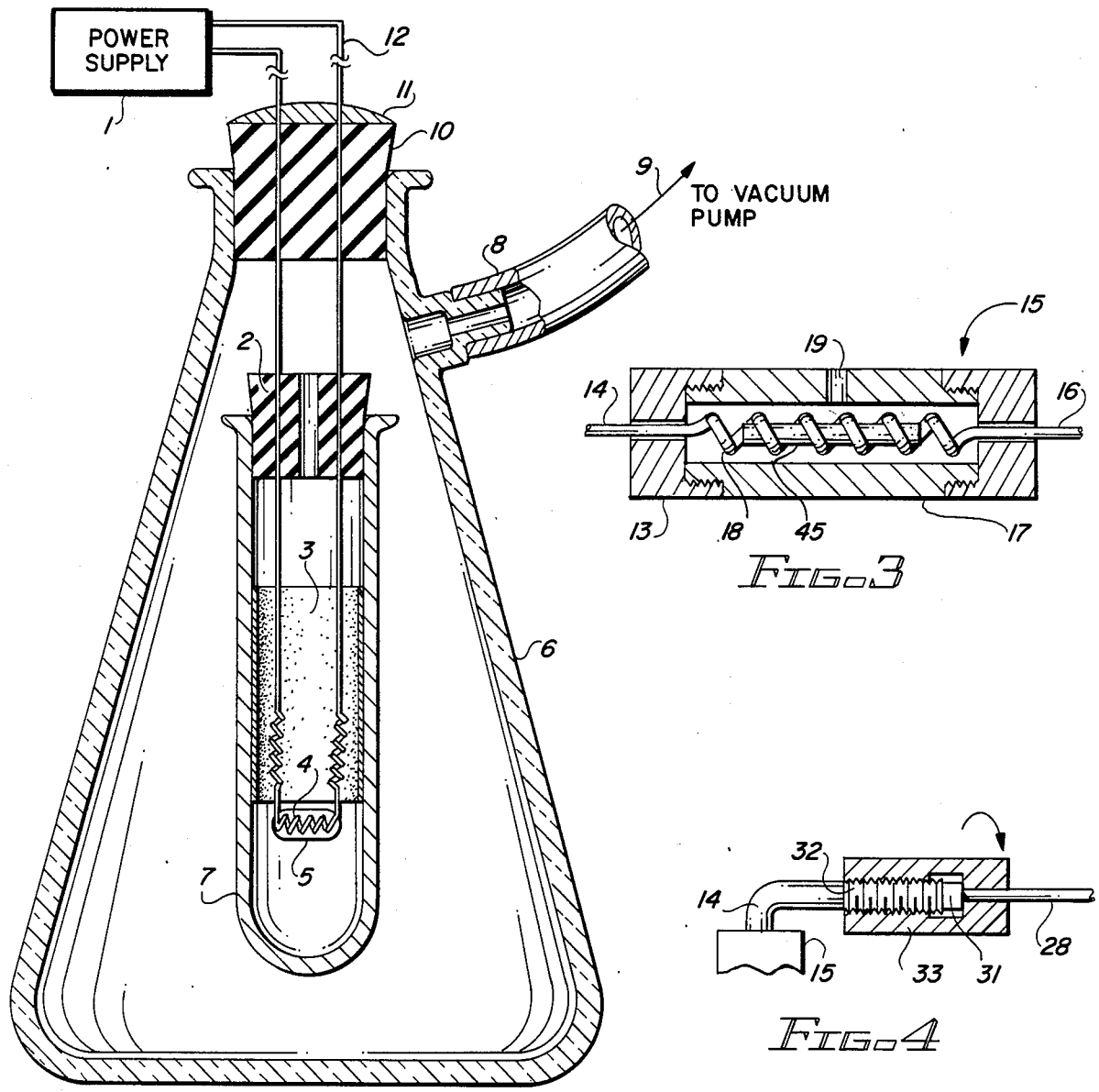
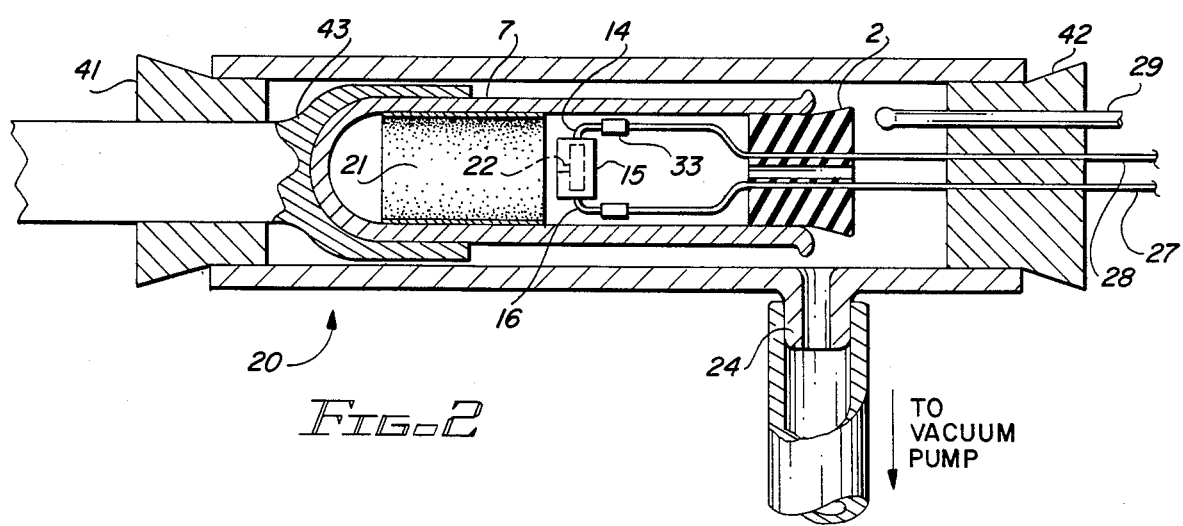

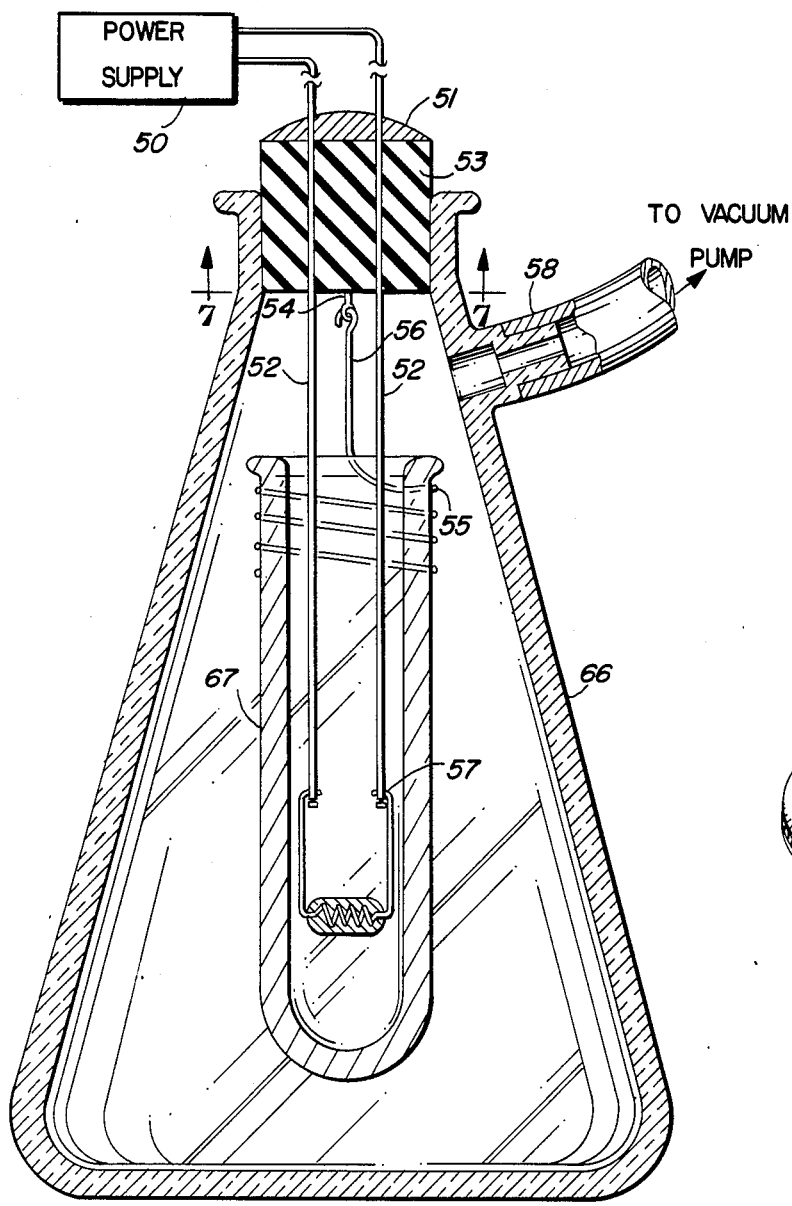
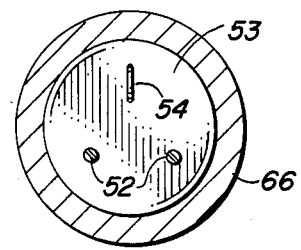
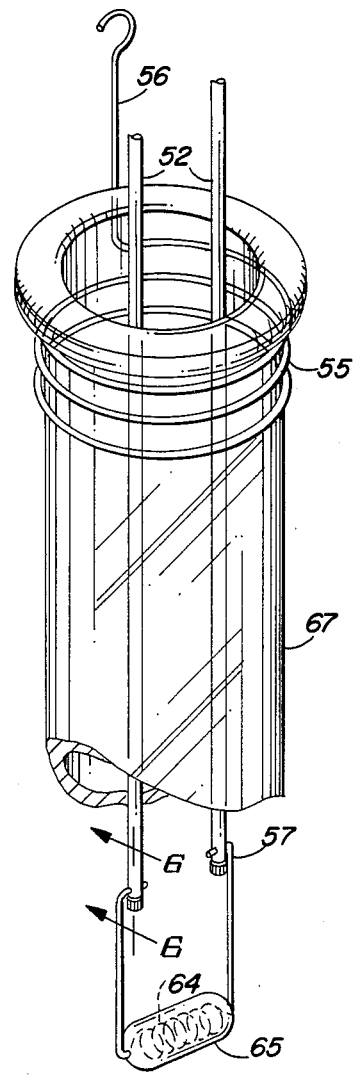
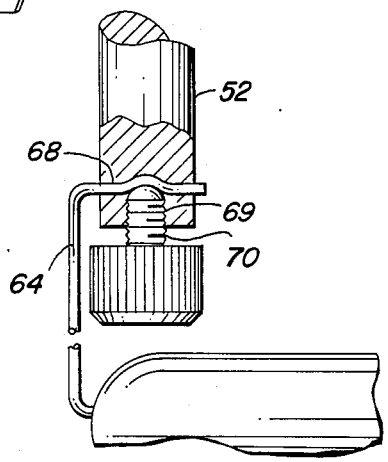

TEACHING DEVICE FOR THE DEMONSTRATION OF SCIENTIFIC PRINCIPLES

BACKGROUND OF THE INVENTION

This application is a continuation-in-part of my copending U.S. patent application Ser. No. 909,619, filed Sept. 22, 1986 now abandoned.

This invention relates to demonstration apparatus useful as a teaching aid in the elucidation of principles of vapor phase deposition, extractive metallurgy and thermodynamics.

At the present time, school curricula are being evaluated and revised to present students with an increased scientific background. The success of a program to increase the exposure of students to scientific principles requires the availability of apparatus which demonstrates objectively the occurrence of different scientific phenomena. The presentation of scientific material from text alone outside a demonstrative environment is felt to prevent many students from gaining an understanding of the basic principles. It is recognized that in most cases direct observation and, if possible, active involvement in conducting experimentation is important in attracting the students attention and promoting their understanding.

Since many of the buildings dedicated to our educational system have limited laboratory facilities, it would be desirable if apparatus were available to demonstrate scientific principles in an observable manner using relatively uncomplex components capable of operation without requiring a full-scale laboratory facility. To this end, the present invention is directed to the provision of versatile apparatus which visually demonstrate to the student the occurrence and results of a number of scientific phenomena. The teaching tool which is the subject of this invention is relatively simple to assemble and disassemble so that the level of training required to successfully operate this apparatus is well within the capabilities of the present members of the teaching profession and interested students.

SUMMARY OF THE INVENTION

This invention relates to apparatus for demonstrating a number of scientific principles and is useful as a teaching aid in support of a science curriculum. Among the areas of technology with which the present invention is of use to an instructor are the fields of extractive metallurgy, vapor phase deposition and thermodynamics. In particular, the apparatus demonstrates chemical reactions involving metal vapors when they reach equilibrium with other products. Also, the present invention readily provides an understanding of the preparation of metallized surfaces by inducing metals to enter the vapor phase and controlling the condensation or deposition thereof. Further, the significance of certain thermodynamic principles, for example the Gibbs Free Energy Equation, can be shown.

The apparatus which is the subject of the present invention comprises a vacuum vessel containing both a first entry port which provides access to the interior of the vessel and a vacuum port. Through a suitable coupling means, the vacuum port is coupled to an evacuation pump. A pressure fit sealing means is provided for effecting a pressure seal of the first entry port so as to maintain the vacuum pressure in the vessel. Prior to placement of the sealing means therein, a second vessel, dimensioned for insertion into the vacuum vessel, is placed inside and provides the immediate environment for the scientific experiment being conducted.

The second vessel contains a passage which communicates with the interior of the vacuum vessel so that pressure equalization between vacuum vessel and second vessel occurs during the conducting of scientific experimentation. The second vessel contains a means for receiving source material and, in addition, a heating means which elevates the temperature of the source material so that at least a portion of the material enters the vapor phase. It is this vapor phase material which is deposited within a proximate region in the second vessel.

An external power supply is coupled to the heating means via electrical coupling means which extend down through the sealing means into the second vessel. In operation, the pressure within the vessels is reduced by actuation of the evacuation pump and the presence of an electrical current through the heating means permits the temperature of the source material to be elevated in a controlled manner and at certain pressures. The vacuum vessel and second vessel are preferably made of transparent material so that the activity therein can be readily observed by the student.

The coating of a portion of the heating element with a compound to be reduced in a heated atmosphere can be utilized to provide source material for the experiments. Typically, the students can fabricate this by dipping a portion of a wire resistor in a slurry of metallic oxide and then allowing it to dry in ambient conditions. However, the drying can be effected by a low temperature bake for several minutes to drive out the slurry carrier, normally water. When this source material is placed in electrical connection to the external power supply, the power supply provides a ready control for elevating the temperature of the metal to thereby cause it to enter the vapor phase. The evacuation pump provides control of the pressure in the reaction environment. Thus, a readily observable and simplified apparatus is provided for conducting several experiments demonstrating a number of different scientific principles.

Further features and advantages of the invention will become more readily apparent from the following description of different embodiments of the invention when taken in conjunction with the accompanying drawings.

BRIEF DESCRIPTION OF THE DRAWINGS

FIG. 1 is a side view in section of a preferred embodiment of the invention.

FIG. 2 is a side view in section of another embodiment of the invention utilizing a condensing element.

FIG. 3 is a side view in section of a suitable source material holder for use in connection with the embodiment of FIG. 2.

FIG. 4 is an expanded cross-section taken from the encircled region of FIG. 3.

FIGS. 5 and 5A are views of yet another embodiment of the invention.

FIG. 6 is an expanded cross-section taken from the encircled region of FIG. 5A.

FIG. 7 is a cross-sectional view taken along lines 7—7 of FIG. 5.

DESCRIPTION OF THE EMBODIMENTS

Referring now to FIG. 1, the subject matter of the present invention is shown including a high quality transparent vacuum flask 6 of 2-liter capacity and having an entry port at its upper end and a vacuum port at one side thereof. The vacuum port is provided with a reduced cross-sectional area extension to frictionally receive suction tubing 8. A conventional clamp may be placed therearound if desired. A vacuum pump is coupled to the opposing end of suction tubing 8 to reduce the pressure within the vacuum flask in a controlled manner by the withdrawal of air therefrom as shown diagramatically by arrow 9.

A stopper 10 formed of a material having a low vapor pressure is placed in the entry port for effecting a pressure seal of the port. Electrical connections 12 extend downwardly through the stopper 10 into the inner region of flask 6. In practice, a silicone caulk cap 11 is placed on the upper surface of stopper 10 to reduce leakage through the passages in stopper 10. Conductors 12 are coupled to a variable power source 1 which is controlled by the person conducting the experiment and demonstrating the scientific principle of interest.

A second vessel shown in FIG. 1 in the form of a glass test tube, preferably having a 1½ inch diameter and a 6 inch length and fabricated of a material which has low reactivity to the metals being utilized in the experiments, is centrally positioned within flask 6. The open end of vessel 7 contains a stopper which has two passageways for the conductors 12 and a centrally located aperture to insure that the interior of vessel 7 is at the same pressure as the interior of flask 6. The relative locations of the passageways and aperture may be varied as necessary though care should be taken to maintain the long conductors 12 at a distance from each other. The conductors 12 are shown extending downwardly to a series of resistance heaters which, in practice, may have a number of configurations. Thus, the conductors 12 both supply power to the resistive heating elements and support the tube 7 and its components in a spaced relationship to vacuum vessel 6.

The horizontal resistance element 4 interconnecting the ends of conductors 12 contains a deposit of source material 5 affixed thereto. The material is preselected in accordance with the particular experiment being conducted and may be coated directly on a wire resistance by a number of different methods including dipping in a slurry. When the power source is activated, the resistance elements are heated and the source material enters the vapor phase to be condensed on the adjacent inner walls of the transparent tube. This experiment demonstrates to the student the mechanics of thin film deposition of metals from the vapor phase and can be used in conjunction of the explanation of the manufacture of a variety of products from reflecting surfaces to thin film electronic components.

In performing demonstrations wherein a metal oxide is reduced and the reaction product is volatile, the resistive heating elements are made of materials with a high melting point, for example, 1400° C., and having the ability to reduce the source material. Also, it is desirable to utilize metal and metal alloy resistive heating elements which themselves have a low vapor pressure. In practice, metal electrodes may be made from tungsten tantalum, platinum, niobium, and molybedenum. It is to be noted that the selection of source material and metal for the resistive heating element are selected by the party using the apparatus as a visual teaching aid.

While the vaporization of aluminum provides one example of vapor phase deposition to coat the central portion 3 of the inner vessel 7, a variety of thin metal films can be formed as a result of the demonstration of chemical reactons producing metal vapors in equilibrium with other reaction products. For example, magnesium, sodium and barium can be deposited in accordance with the following equations:

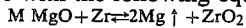

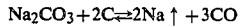

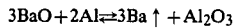

While the embodiment of FIG. 1 provides apparatus for demonstrating extractive metallurigical processes and film deposition for metals which enter the vapor phase upon the application of heat to either initiate and promote chemical reduction thereof or evaporate without reaction, the present invention can also be processes involving non-evaporating materials, such as iron.

The embodiment of FIG. 2 utilizes a ceramic tube 20 as the primary vessel with sealing end stoppers 41 and 42 placed at opposing ends. The test tube 7 is provided with a source material container 23 having the heating element and source material therein and denoted as element 22 by the dashed lines in FIG. 2. The constructional details of the container 23 and its interconnection with conductors 27 and 28 are shown in FIGS. 3, 4 and will be later discussed in further detail.

The ceramic tube 20 is shown with vacuum port 24 placed in one side thereof and coupled to an evacuation pump. While the connection is provided in the embodiment of FIG. 2, it should be noted that many types of demonstrations can be performed in the apparatus at atmospheric pressure and thus the vacuum port can be omitted in other embodiments of the invention. The sealing stopper 42 placed in the first entry port of the apparatus contains conductors 27 and 28 which are coupled to an external power source (not shown). In addition, transducer 29 is inserted in the stopper 42 for providing an external pressure reading if desired.

The opposing end of quartz tube 20 is provided with a second entry port fitted with sealing stopper 41. An externally extending support 43 is supported in stopper 41 and provides structural support for the closed end of tube 7. The support for the opposing end of tube 7 is provided by conductors 27 and 28 so that it is spaced from the sidewalls of tube 20 during operation. In addition to maintaining test tube 7 substantially horizontal, support 43 surrounds the lower region of tube 7 thus tending to provide a region of lower temperature in the tube during operation. The support 43 extends outwardly of the second port of quartz tube 20 and serves as a conductor of heat away from the contact region of tube 7 to thereby promote condensation of vapor phase material within the proximate region of tube 7 during operation.

The source material container 23 supported within tube 7 by the innermost extensions of conductors 27 and 28 is shown in detail in FIG. 3 as a furnace 15 of limited size. The furnace 15 is comprised of three ceramic parts capable of withstanding temperatures in excess of 1000° C.; end caps 13 having a centrally located aperture therein and tubular central sleeve 17 having an exit aperture 19 in the wall thereof. The resistive heating element 18 contained within furnace 15 is provided with outwardlyextending conductive wire portions 14 and 16 for removable connection to conductors 28 and 27 respectively. As shown, the wire portions 14 and 16 extend through end caps 13 of the furnace and provide the necessary structural support therefor. As will be noted from FIG. 4, the furnace can be readily disassembled by unthreading the end caps and sliding them off the respective end of the heating element 18 when the combination is decoupled from conductors 28 and 27. While this embodiment of the furnace shows the heating element axially disposed therein and spaced from the sidewall of ceramic sleeve 17, the heating element may be located in a spiral groove formed on the inner sidewall thereof if desired. The configuration of the source material 45 with which the furnace is charged varies from powder or granules to solid pellets and bar stock. A compressed source material charge in the form of a bar 45 inserted in the helical heating element is shown in FIG. 3 by way of example.

The interconnection between the wire portions 14, 16 and the corresponding conductor 28, 27 is shown in FIG. 4 wherein the free end 32 of conductor 14 is threaded to receive an internally-threaded sleeve 33 thereon. Conductor 28 is provided with a large area end 31 which prevents threaded sleeve 33 from moving past when the sleeve is rotated to draw the end 32 of conductor 14 in firm contact with large area end 31. The interconnection between conductors 27 and 16 is similar. Thus, the furnace can be readily decoupled from the conductors 27, 28 and disassembled to provide ready access to its interior.

In operation, the external power source causes the heating element within the furnace to elevate the temperature of the source material which, if it enters the vapor phase, exits the furnace through aperture 19. The condensing action occurs at the closed end of the tube to result in deposition as shown by film 21. The pressure may be lowered if desired for the demonstration.

In the case of non-evaporative materials, for example, where a small quantity of pure metal is to be made for a subsequent application, the heating of the source material will cause the impurities to enter the vapor phase and exit through aperture 19 to condense on the tube wall. The use of a crucible in the furnace 15 permits demonstrations of the steel-making process or the refining of precious metals.

Another embodiment of the invention is shown in FIGS. 5 and 5A wherein vacuum flask 66 is provided with an entry port at its upper end and a vacuum port at one side thereof for coupling to tubing 58. A stopper 53 having a silicone material 51 located on its upper surface is inserted into the entry port to provide a pressure seal thereof. A pair of stainless steel conductive rods 52 spaced approximately three-fourths of an inch apart extend through the stopper for external connection to a power supply 50.

The conductive rods are 8 inches in length and extend downwardly into the test tube 67. The test tube having a nominal outside diameter of 1 inch is supported from a threaded support eye 54 inserted in the underside of stopper 53 to an approximate depth of three-fourths of an inch and removably coupled to the hooked extension 56 of helical support member 55.

The helical support member shown in further detail in FIG. 5A, fabricated from zinc-plated spring wire, has an inside diameter slightly larger than the closed end of the test tube but less than the flanged open end. In the embodiment shown, the test tube has a 1.00 inch O.D. and the helical support has 1.06 I.D. to provide a slidable fit therebetween. Thus, the test tube 67 is supported by its flange resting against the helical support thereby facilitating removal of the active elements of the invention from the vacuum flask and test tube in situations wherein multiple demonstrations are to be conducted in a limited time period, e.g., a 50-minute classroom period.

The placement of the two conductive rods 52 in relation to the location of the support eye 54 is shown in FIG. 7 wherein the three elements are noted as being positioned to form an equilateral triangle and thus distribute the forces on the stopper 53. In addition, this embodiment provides a readily detachable fastener 57 on conductive rods 52 for the resistance heating element 64 and source material 65 contained thereon. The fastener 57 is shown in further detail in FIG. 6 wherein the end of a conductive rod is provided with an axially-aligned threaded opening 69 having a concave bottom therein. A threaded bolt 70 with a convex end is inserted therein. A lateral hole 68 is formed across the end of the conductive rod and intersects opening 69 proximate to the concave end. The end of the resistance heating wire 64 is bent at an approximate right angle, inserted in hole 68 to extend through the rod 52 and the bolt 70 is tightened to frictionally engage the wire. Each conductive rod has a readily releasable fastening means for the resistance wire thereby enabling a facile change of active elements.

While the above-description has referred to specific embodiments of the invention, it is recognized that many modifications and variations may be made therein without departing from the scope of the invention as claimed.

What I claim is:
1. Portable apparatus for demonstrating scientific principles as a teaching aid, said apparatus comprising:
   (a) a first vessel formed as a one-piece structure, said vessel containing a base member and having sides extending upwardly therefrom to form a first entry port opposingly spaced from said base member, said base member having a substantially planar surface area to be removably received on a supporting surface, the surface area of said base member being at least as large as said first entry port;
   (b) sealing means for removable placement in said first entry port to affect a pressure seal thereof;
   (c) a second vessel dimensioned for insertion through said first entry port into said vacuum vessel and containing a passage therein communicating with the interior of said first vessel;
   (d) electrical conductor means for supporting source material in said second vessel; said conductor means extending through the sealing means in said first entry port into said second vessel;
   (e) means coupled to said sealing means for suspending said second vessel in said first vessel below the first entry port, said suspending means spacing said second vessel from the base member and sides of said first vessel; and
   (f) heating means connected to said electrical conductor means and located within said second vessel proximate to the source material, said heating means being coupled by said conductor means to an external supply, the activation of said heating means causing at least a portion of said source material to enter the vapor phase, said vapor phase material being deposited within said second vessel.

2. Apparatus in accordance with claim 1 wherein said means for suspending said second vessel includes stopper means having an aperture therein and passageways for receiving and engaging the electrical conductor means, said stopper being dimensioned to fit in the passage of said second vessel.

3. Apparatus in accordance with claim 1 wherein said second vessel includes flange means at said passage, and said means for suspending said second vessel including a helical support member having a first end attached to said sealing means, said member receiving the flange means of the second vessel in the helix for support.

4. Apparatus in accordance with claim 1 wherein said means for receiving source material in said second vessel includes a segment of said heating element having a source material coating thereon.

5. Apparatus in accordance with claim 4 wherein said first vessel is a vacuum vessel including a vacuum port therein, said apparatus further comprising means for coupling the vacuum pump to an evacuation port.

6. Apparatus in accordance with claim 4 further comprising housing means surrounding the segment of heating element having a source material coating thereon, said housing means including a passageway therethrough for the movement of material in the vapor phase.

7. Apparatus in accordance with claim 6 wherein said housing contains spaced apertures for the passage of opposing ends of said segment of wire, said housing being supported thereon.

* * * * *